United States Patent Office 3,389,750
Patented June 25, 1968

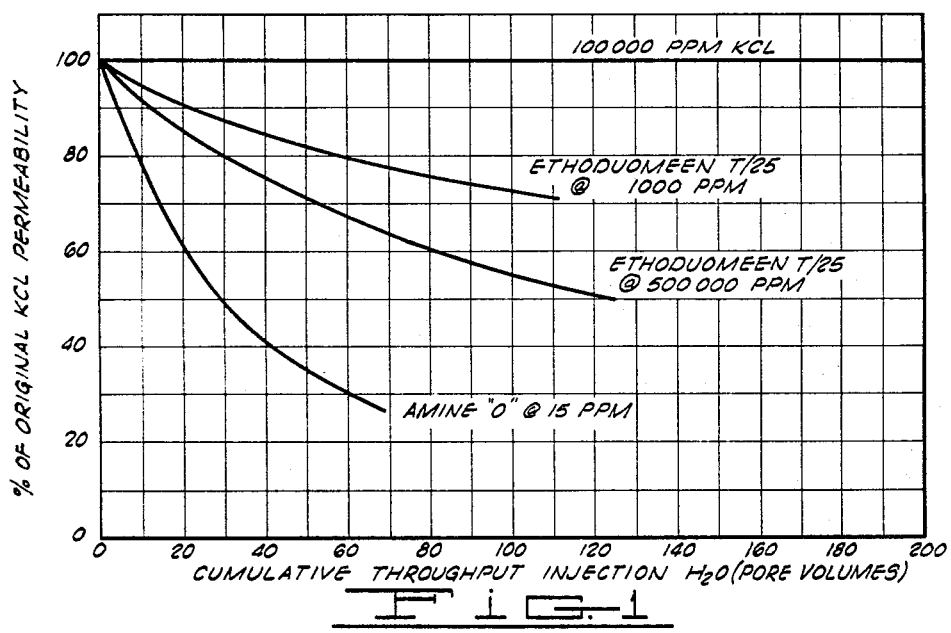
Fig. 1 — 3CC slugs of amines followed by artificial injection $H_2O$, Viking Sandstone cores.
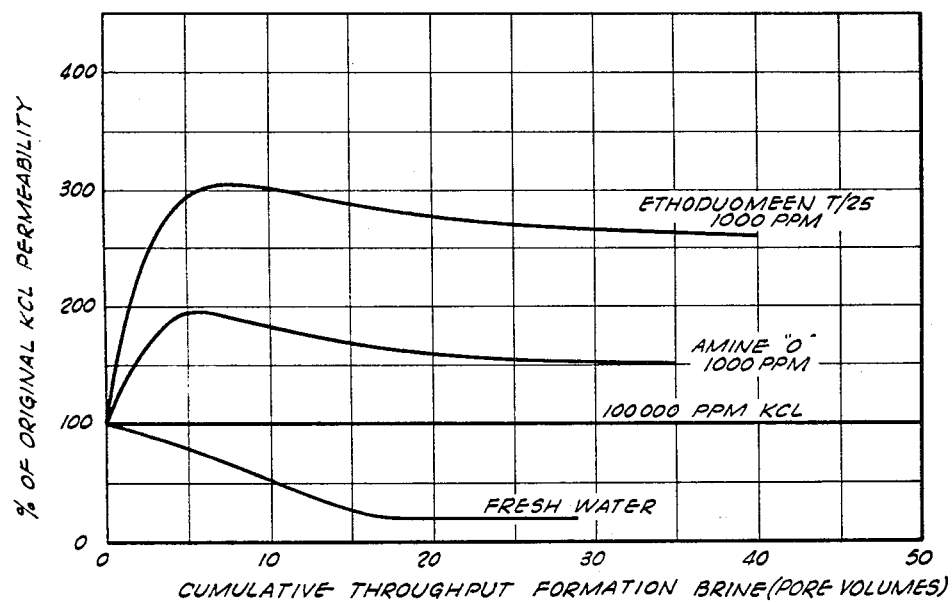
Fig. 2 — 3CC slugs of 1000 ppm amines followed by formation brine, oil saturated muddy sandstone cores.
INVENTORS
BRUCE F. BOHOR,
ROBERT B. CRONIN &
CARROLL E. KNUTSON
ATTORNEY

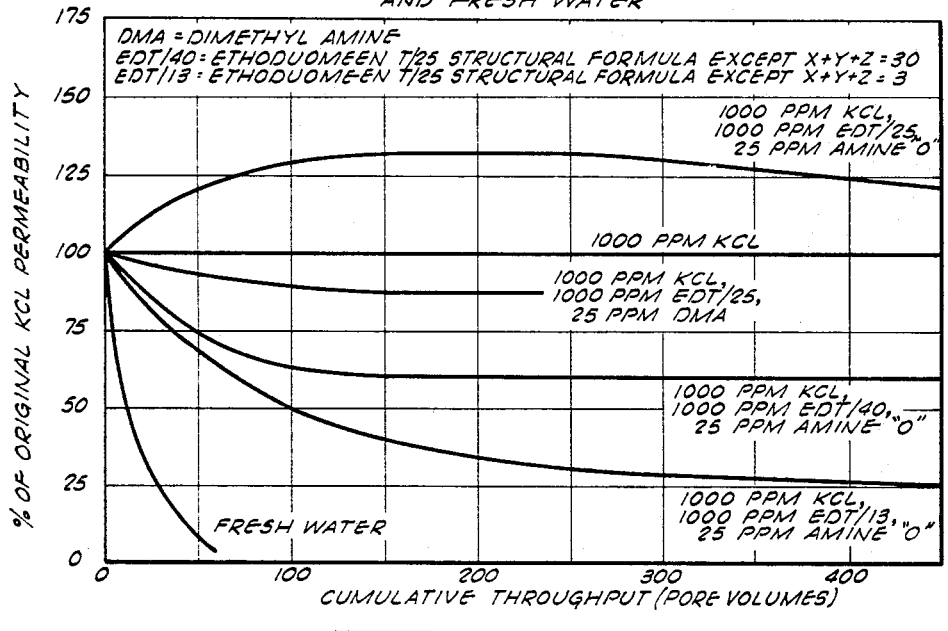
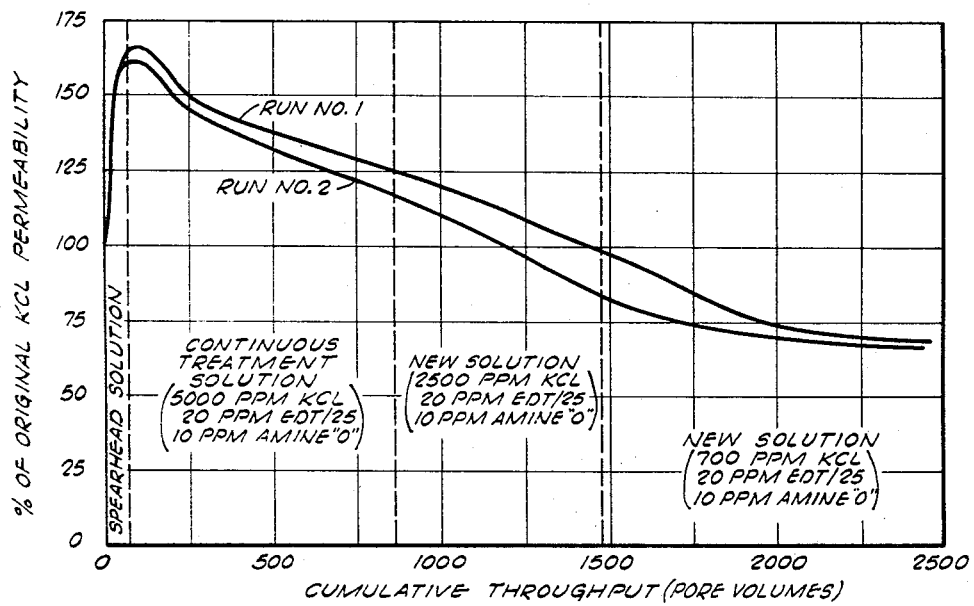

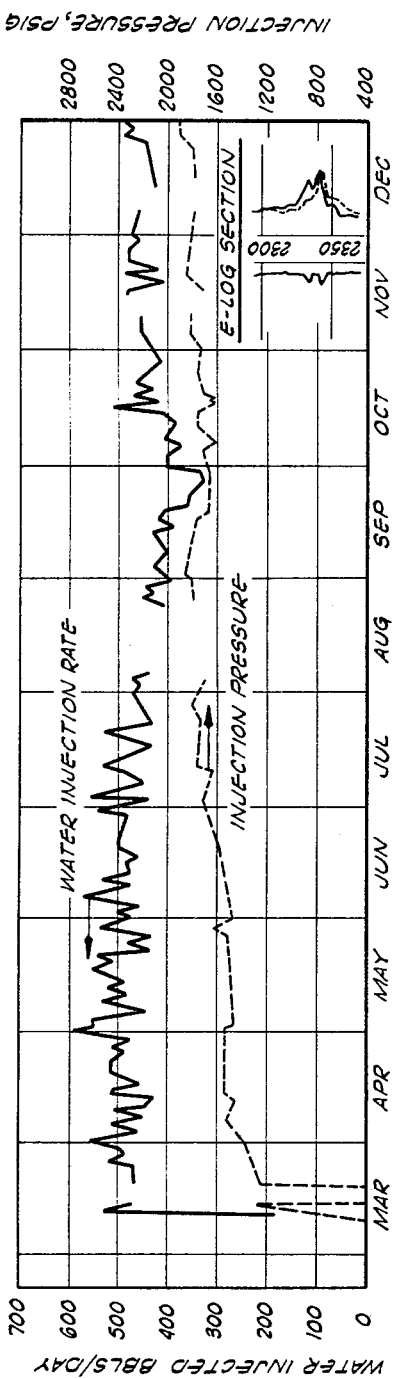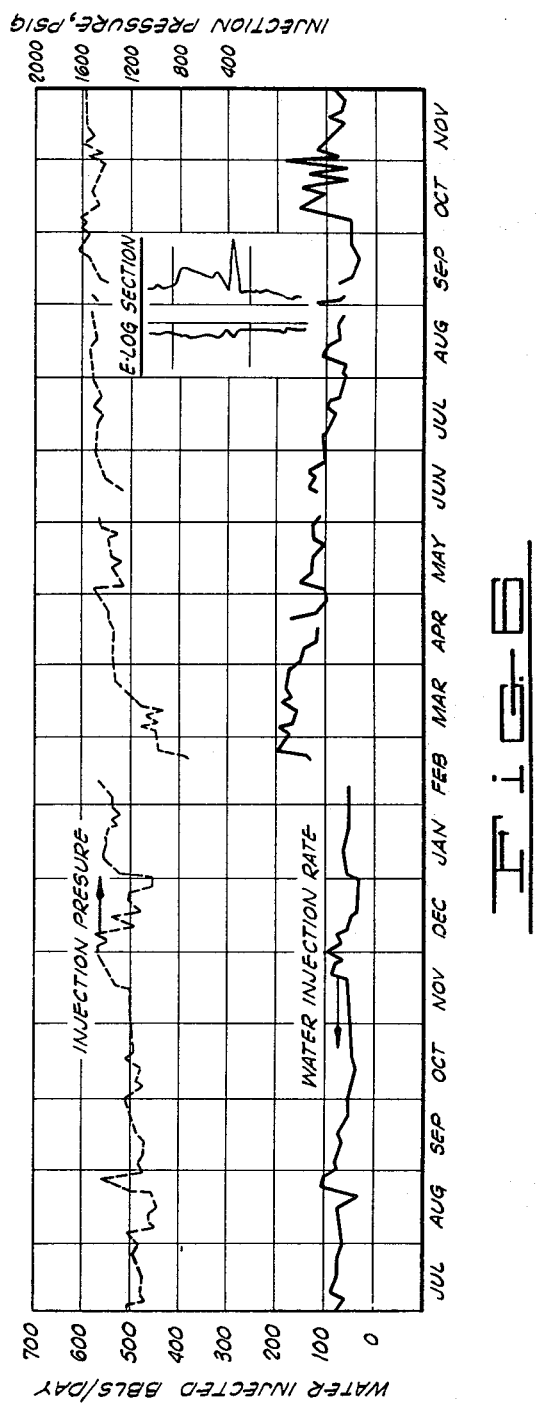
FIG. 5
FIG. 6
INVENTORS
BRUCE F. BOHOR,
ROBERT B. CRONIN &
CARROLL F. KNUTSON
ATTORNEY

3,389,750
PROCESS FOR MAINTAINING THE PERMEABILITY OF CLAYEY PETROLIFEROUS FORMATIONS DURING WATERFLOODING
Bruce F. Bohor, Ponca City, Robert B. Cronin, Blackwell, and Carroll F. Knutson, Ponca City, Okla., assignors to Continental Oil Company, Ponca City, Okla., a corporation of Delaware
Filed Sept. 30, 1964, Ser. No. 400,423
10 Claims. (Cl. 166—9)

This invention relates to a composition useful for increasing or maintaining the permeability of certain types of petroliferous formations so that water may be more easily injected into such formations for the purpose of recovering oil therefrom. More particularly, this invention is directed to new compositions which are effective in simultaneously minimizing metal corrosion, reducing the swelling of clays in certain types of subterranean formations and in inhibiting the growth of certain types of bacteria which are active in plugging oil producing sands. The invention is further concerned with a novel process for employing the compositions of the invention in recovering oil from subterranean formations.

A large percentage of the oil in petroliferous strata is held in the rock of the strata by the surface forces between the rock, the oil and the formation water. As a result, a substantial portion of this oil usually remains in the rock even when wells traversing the strata are no longer productive. Various techniques, such as thermal recovery, gas injection and waterflooding, have been suggested for the recovery of this fixed oil which remains in the formation after it can no longer be produced by primary recovery techniques. Of these techniques, waterflooding is quite commonly chosen, and a multitude of additives to the water injected into the formation during waterflooding have been suggested for the purpose of improving the efficiency and economy of this method.

The present invention comprises a novel composition of matter which consists essentially of water and three materials, at least two of which have heretofore been generally recognized as effective in alleviating certain specific difficulties which frequently are encountered in waterflooding procedures. These difficulties, in each case, entail a reduction in the formation permeability, and a decrease in the rate of injectivity of water into the formation. The conditions giving rise to these difficulties are, first, the existence in the formation of clay minerals which, when contacted with water (particularly fresh water), swell to the extent that the permeability of the oil sand is severely reduced and recovery of the oil by waterflooding rendered substantially less efficient or totally unsuccessful. The second condition is the presence in the floodwater of rapidly multiplying bacteria which can in time partially plug the formation and substantially decrease the rate of water injection. Yet another problem which is successfully solved through the use of the compositions of the present invention is that posed by the low relative permeability of the formation immediately around the floodwater injection well which causes injectivity rates of the floodwater to be excessively low.

Broadly described, the compositions of the present invention comprise water and an additive consisting essentially of (a) a potassium-containing salt which is soluble in the floodwater, (b) a relatively high molecular weight, cationic trimethylene diamine having the general structural formula

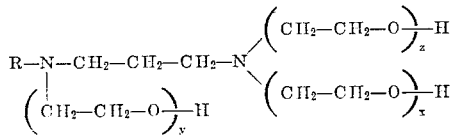

where R is an alkyl group derived from a fatty acid or mixed fatty acids, and contains from about 12 to about 20 carbon atoms, and where $x+y+z$ equals from about 5 to about 25, and (c) a high molecular weight imidazoline selected from the group having the general structural formulae:

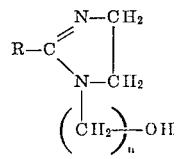

and

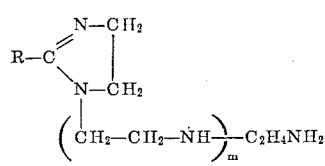

where R is a hydrocarbon group derived from a straight chain fatty acid and containing from about 14 to about 22 carbon atoms, $n$ is an integer of from 1 to 3, and $m$ is an integer of from 0 to 2. The amounts of the several active components in the aqueous composition are as follows: From about 1 to 25 parts per million of the imidazoline, from about 1 to about 5,000 parts per million of the diamine, and from about 100 to about 500,000 parts per million of the potassium salt. (Parts by weight.) Stated differently, the waterflood additive consists essentially of 1 to 25 parts by weight of imidazoline, from about 1 to about 5,000 parts by weight of the diamine, and from about 100 to about 500,000 parts by weight of the potassium salt. The additive can be pre-mixed prior to addition to the injected water, but preferably these components are added to the water individually with the imidazoline being added last.

The precise ratio of the three components in the composition is dependent upon the way in which the composition is to be used in the waterflooding procedure and, to some extent, to the particular chemical character of the formation materials. Thus, in a preferred method of practicing the process of the invention, water containing a relatively high concentration of the postassium salt is initially injected into the formation as a spearhead prior to continuous injection of water containing a lesser amount of the potassium salt and, in most instances, a slightly lesser amount of the amine. The purpose of initial injection of the spearhead containing a high amount of potassium salt is to overcome dilution problems in the critical area around the well bore and condition the formation to the use of the lower concentration of potassium salt used during the continuous flood which follows. Preferably, the initial spearhead of injection water contains from around 5,000 to 500,000 parts per million of the potassium salt, from 5 to 5,000 parts per million of the high molecular weight diamine, and from about 5 to 15 parts per million of the imidazoline. After passage of the spearhead water into the formation, the concentration of potassium salt in the water is reduced to from about 500 to about 5,000 parts per million, the high molecular weight diamine concentration is reduced to from about 5 to about 200 parts per million, while the concentration of the high molecular weight imidazoline is maintained substantially constant, i.e., from 5 to 15 parts per million.

We have surprisingly determined that the several ingredients of the additive of this invention appear to be compatible in the sense that no reduction in the functioning of any one of the ingredients for its intended purpose is effected by any of the other ingredients. Moreover, a definite synergistic effect has been noted to characterize the composition, and the cumulative result of the concurrent use of the three components of the additive in the defined proportions appears to be substantially greater insofar as retention of permeability and rates of injectivity are concerned than when any of the ingredients or components of the additive is used alone in waterflooding in quantities substantially equal to the quantities in which the total composition is used in the present invention.

From the foregoing description of the invention, it will have become apparent that it is a major object of the present invention to provide an improved process for maintaining the permeability of petroliferous subterranean formations during the recovery of hydrocarbons therefrom using waterflooding procedures.

An additional object of the present invention is to provide a relatively inexpensive additive for injection water used in the secondary and tertiary recovery of petroleum from subterranean petroliferous strata, which additive is effective in maintaining the permeability of the formation despite the presence in the formation of considerable quantities of water sensitive clay minerals.

An additional object of the present invention is to provide a composition of matter for use in waterflooding, which composition effectively inhibits detrimental bacterial growth in the producing formation, and maintains a high level of permeability in the formation.

Another object of the present invention is to provide a composition of matter useful in the waterflood technique of oil recovery, which composition exhibits corrosion inhibiting properties and reduces the formation of scale and corrosion products on the pumps, tubing and valves used to inject water into the oil bearing formation.

In addition to the foregoing described objects and advantages of the invention, other objects and advantages will become apparent as the following detailed description is read in conjunction with the accompanying drawings which illustrate certain aspects of the invention.

In the drawings:

FIGURE 1 is a graph showing the results of laboratory core tests used to evaluate the effect upon formation permeability of adding certain types of oil-scavenging and bactericidal compounds to the injection water used to waterflood the formation.

FIGURE 2 is a graph showing the results of other laboratory core tests similar to those yielding the data plotted in FIGURE 1, but using less water sensitive cores from a different formation.

FIGURE 3 is a graph similar to those portrayed in FIGURES 1 and 2, but showing the results obtained when injection water was treated with the three component additive of this invention as compared to other three component aqueous systems and with untreated water.

FIGURE 4 is a graph illustrating the effect upon formation permeability of injecting into laboratory cores, an initial spearhead solution containing relatively high concentrations of a potassium salt and high molecular weight diamine, followed by aqueous solutions containing reduced concentrations of these materials.

FIGURE 5 is a graph showing the injection rates and pressures obtained in a field test using the present invention.

FIGURE 6 is a graph showing the injection rates and pressures obtained when a comparison well was use in field testing the invention to provide data for comparison purposes. The additive of the invention was not used to treat water injected via the well providing the data plotted in FIGURE 6.

As has been hereinbefore indicated, the composition utilized in the practice of the present invention consists essentially of water and three components which are (a) a potassium-containing inorganic salt, (b) a relatively high molecular weight, cationic trimethylene diamine, and (c) a high molecular weight imidazoline. Specific considera- tion will initially be given to each of the components of the composition.

The potassium salts which can be used in the waterflood additive of the invention can contain a wide variety of anions with the critical element of the compounds, of course, being potassium. The potassium ion is exchangeable with other ions of the water sensitive clayey materials in the hydrocarbon containing formation, and by such ion exchange, the potassium ion functions to hold the layers of the clay minerals together so tightly that no water is able to enter between the layers and cause expansion or swelling. The type of anion which is chemically combined with the potassium ion in the salts used in the invention must permit such salts to remain highly soluble in the water which is available for waterflooding, and must be compatible with other types of salts which may be present in such water. Moreover, a few types of anions may be undesirable because of reactivity or deleterious adsorption on the formation minerals and should be avoided for this reason. Aside from the important criteria of compatibility with the formation materials and salts in the floodwater, and a high degree of solubility in the floodwater, a primary consideration in selection of the potassium salt for use in the invention is cost. Potassium chloride, potassium borate, potassium sulfate and potassium nitrate may be mentioned as typical of the potassium salts which may be employed. Potassium chloride constitutes the preferred potassium salt for use in the composition.

As hereinbefore indicated, the high molecular weight, cationic trimethylene diamine compounds which are useful in the waterflood additive of the invention have the structural formula.

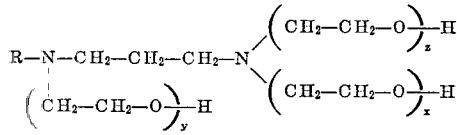

where R is an alkyl group derived from a fatty acid or mixed fatty acids and contains from about 12 to about 20 carbon atoms and where $x+y+z$ equals from about 5 to about 25. Compounds of this general type are commercially available, and are usually derived from fatty acids containing from 14 to 18 carbon atoms. The source of the alkyl group in the above formula may thus be tallow or coconut oil, and methods of synthesis of the compounds are well understood in the art. The parenthetically enclosed ethylene oxide groups set forth in the structural formula may, as indicated, total from 5 to about 25, with 12 to 18 ethylene oxide groups being preferred and 15 ethylene oxide groups constituting the optimum arrangement. The alkyl group of the compound may be either saturated or unsaturated. A slight amount of unsaturation such as that found in the oleyl radical derived from tallow is preferred. A material which has been found especially effective in the practice of the invention is a mixture of compounds having the structural formula

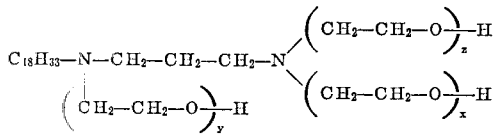

where the sum of $x+y+z$ is between about 5 and about 25 in the individual compounds and averages 15 for the mixture. This material is sold by the Armour Industrial Chemical Company of Chicago, Ill., under the trade name Ethoduomeen T/25. This material is also termed N-tallow trimethylene diamine.

The primary contribution of the high molecular weight, cationic trimethylene diamine to the function of the composition of the invention derives from its activity as a detergent or oil-scavenging compound. The high molecular weight cationic surfactant also acts to waterproof the clays and thereby inhibit swelling. Apparently, the large organic molecules of the diamine are adsorbed as ions between the layers of the clay, and in this position prevent water from entering the clay layers.

The third component of the additive used in the practice of the invention is an imidazoline derived from a straight chain fatty acid. The imidazolines useful in the invention may be represented by the structural formulae

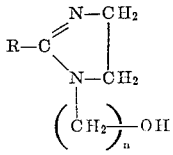

and

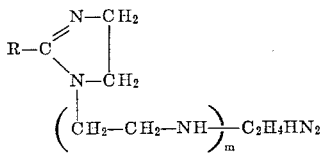

wherein R is a hydrocarbon group derived from a straight chain fatty acid and containing from about 14 to about 22 carbon atoms, $n$ is an integer of from 1 to 3, and $m$ is an integer of from 0 to 2. Compounds of this general type, and the method of synthesis of such compounds are described in United States Patent 3,049,492. Preferably, compounds of the type indicated by the first structural formula and having a hydroxy group attached to the methylene groups are employed. A typical compound which has proved very useful in the practice of the invention is 1-hydroxyethyl-2-heptadecenyl imidazoline which is sold under the trade name Amine "O" by the Geigy Industrial Chemicals Company of Yonkers, N.Y.

The imidazoline compounds used in the composition of the invention are high molecular weight cationic surfactants, but demonstrate considerably less oil-scavenging and clay desensitizing ability than the high molecular weight cationic trimethylene diamine. Also, the imidazolines are relatively insoluble in water and are brought into the solution of injection water by the solubilizing effect of the high molecular weight diamine.

Specific, though non-limiting, examples of three component additives of the type described are:

potassium chloride, 1-hydroxyethyl-2-hexadecenyl imidazoline and N-hexadecenyl-N-hexapolyoxyethylene-N'-pentapolyoxyethylene-N'-tetrapolyoxyethylene-1,3-propanediamine;

potassium sulfate, 1-diethyldiamino-2-pentadecenyl imidazoline and N-nonodecenyl-N-heptapolyoxyethylene-N'-nonapolyoxyethylene-N'-tripolyoxyethylene-1,3-propanediamine;

potassium bromide, 1-triethyltriamino-2-heneicosenyl imidazoline and N-dodecenyl-N-hexapolyoxyethylene-N'-N'-tripolyoxyethylene-N'-tetrapolyoxyethylene-1,3-propanediamine;

potassium bromide, 1-triethyltriamino-2-heneicosenyl imidazoline and N-pentadecenyl-N-decapolyoxyethylene-N'-tripolyoxyethylene-N'- tetrapolyoxyethylene-1,3-propanediamine;

potassium nitrate, 1-hydroxypropyl-2-octadecenyl imidazoline and N-heptadecenyl-N-dodecapolyoxyethylene-N'-nonapolyoxyethylene-N'-tetrapolyoxyethylene-1,3-propanediamine;

potassium chloride, 1-diethyldiamino-2-pentadecencyl imidazoline and N-dodecenyl-N-hexapolyoxyethylene-N'-hexapolyoxyethylene-N'-heptapolyoxyethylene-1,3-propanediamine;

potassium sulfate, 1-hydroxypropyl-2-pentadecenyl imidazoline and N-pentadecenyl-N-decapolyoxyethylene-N'-tripolyoxyethylene-N'-tetrapolyoxyethylene-1,3-propanediamine;

potassium acetate, 1-triethyltriamino-2-heneicosenyl imidazoline and N-heptadecenyl-N-dodecapolyoxyethylene-N'-nonapolyoxyethylene-N'-tetrapolyoxyethylene-1,3-propanediamine;

potassium bromide, 1-hydroxyethyl-2-hexadecenyl imidazoline and N-nonodecenyl-N-heptapolyoxyethylene-N'-nonapolyoxyethylene-N'-tripolyoxyethylene-1,3-propanediamine;

potassium nitrate, 1-hydroxypropyl-2-pentadecenyl imidazoline and N-dodecenyl-N-hexapolyoxyethylene-N'-hexapolyoxyethylene-N'-heptapolyoxyethylene-1,3-propanediamine.

The concentrations of the several additive components which are used in the waterflood may vary over quite a large range. In general, the amount of potassium salt employed far exceeds the amounts of the other two components used. Broadly, the concentration of potassium salt utilized can range from about 100 to about 500,000 p.p.m. The concentration of the diamine utilized may be from about 1 to about 5,000 p.p.m. and the concentration of the imidazoline may be from about 1 to about 25 p.p.m. As has been previously indicated, it is preferred, in the practice of the method of the invention, to initially inject a quantity of water (hereinafter termed the "spearhead") which contains relatively high concentrations of the potassium salt and the diamine in order to improve the overall effectiveness of the water treatment. This is because the most critical area of the waterflood is the region around the injection well bore. A pretreatment of this region with a concentrated aqueous solution of the additive tends to condition the formation surrounding the well bore so that it will not rob by adsorption, the subsequently injected water of the diamine and the imidazoline, and will permit these materials to be extended farther into the surrounding formation.

In the concentrated spearhead, it is preferred to utilize a potassium salt concentration of from about 5,000 to 100,000 p.p.m., although concentrations of the potassium salts of as high as 500,000 p.p.m. may yield desirable results in some types of formations. The concentration of the diamine in the spearhead is preferably from about 5 to about 5,000 p.p.m., and most preferably, from about 100 to 5,000 p.p.m. The imidazoline concentration is from about 5 to about 25 p.p.m., and preferably, from about 5 to about 15 p.p.m. The amount of water injected during the spearheading operation is from about 2 pore volumes to about 10 pore volumes, with 3 or 4 pore volumes usually being sufficient. In this context, the term pore volume is intended to connote a volumetric unit which is equal to the average effective porosity of the portion of the formation which is to be contacted by the waterflood multiplied by the bulk volume of this portion of the formation. The term is thus variable according to the type of waterflooding pattern being followed in a given situation, and the nature of the formation being subjected to waterflooding. The meaning of the term will be understood by those skilled in the art. Typically, from 5 to 100 barrels of the spearhead solution will be injected for each foot of thickness of the producing formation as measured vertically through the formation. The water sensitivity of the clayey materials in the formation will dictate a more specific volume of the spearhead solution to be injected. Clays of average sensitivity will typically require the injection of about 25 barrels of the spearhead solution for each foot of formation thickness.

The spearhead containing relatively high concentrations of the potassium salt and diamine is followed by the injection of water carrying lower concentrations of the potassium salt and diamine. Generally, the continuous waterflood which is injected into the formation after the spearhead contains from about 500 to 5,000 p.p.m. of the potassium salt, from about 5 to about 200 p.p.m. of the diamine, and from about 5 to about 15 p.p.m. of the high molecular weight imidazoline.

Laboratory and field tests have indicated that the additive of the invention yields an effective waterflooding composition. When employed in highly water sensitive clay formations, the injectivity rate of the injection water is maintained at a relatively high value as compared with untreated water, and relatively little deleterious effect as a result of bacterial growth is experienced. Tests have also indicated that the three component additive of the invention, when used in the hereinbefore described quantities, is more effective in retaining high permeability in the formation than any of the components of the additive used individually, or than any two of the three constituents of the additive when used together.

The following examples will serve to further illustrate the practice of the invention, and to demonstrate the synergism which is experienced when the three components of the additive used in the invention are used in combination with each other.

EXAMPLE 1

Core samples were taken from the Eureka Viking sand pool in the Dodsland field in southwestern Saskatchewan, Canada. These cores are composed of medium-grained, shaley sandstone which is quite water sensitive and contains from 15 to 20 percent by weight clay. Much of the clay content is made up of the highly water sensitive clay minerals, montmorillonite and degraded illite. The cores had a permeability to air range of from 1 to 26 millidarcies and a porosity range of from 8 to 19 percent.

In laboratory screening tests of these cores to determine the type of injection water to use in waterflooding the Viking formation, it was determined that fresh (river) water, sodium chloride synthetic formation brine, and also calcium, magnesium, and barium chloride brines all engendered an unacceptably high degree of swelling, cracking and sloughing in the cores. Potassium chloride brine, however, showed no unfavorable reaction with, or effect upon, the cores. Of course, the potassium chloride brine did not demonstrate any bactericidal or oil-scavenging (detergent) properties. However, since it did not produce any swelling or substantial reduction in the permeability of the cores, it was used as a standard with which other additives or treating agents were compared relative to the question of reductions or increases in permeability of the cores.

The reference or standard permeability used for comparison purposes in the subsequently described examples was obtained by initially saturating 1 cc. plugs cut from the Viking sandstone cores in brine containing 100,000 p.p.m. KCl. About 20 pore volumes of 80 pale oil were then flowed through the plugs, followed by about 40 pore volumes of the KCl brine. At this point, the core plugs were assumed to be at residual hydrocarbon saturation (RHS), and their permeability to the KCl brine was measured. This permeability value was used as an original (100 percent) permeability standard with which to compare the permeability data obtained using other compositions.

EXAMPLE 2

In order to retain the swelling-inhibiting effect of the KCl solution, and yet provide a biologically sterile system which would yield a minimum residual hydrocarbon saturation (RHS), a number of chemical compounds were tested for oil-scavenging ability and bactericidal properties. After preliminary screening by a bulk swelling test, the most promising compounds were evaluated by flow tests through small 1 cc. Viking sandstone plugs, and also by flow tests through permeable, less shaley sandstone plugs from the Muddy Formation in Wyoming. The latter plugs were characterized in having a permeability of from 1 to 20 millidarcies and a porosity of from 12 to 15 percent. In the tests of oil-scavenging ability, the commercially available mixture of high molecular weight, cationic trimethylene diamine sold under the trade name Ethoduomeen T/25 by the Armour Industrial Chemical Company of Chicago, Ill., and previously described herein, performed the best. Of the bactericidal compounds tested, the best performance was yielded by an imidazoline, 1-hydroxyethyl-2-heptadecenyl imidazoline, sold under the trade name Amine "O" by the Geigy Industrial Chemicals Corporation of Yonkers, N.Y.

An indication of the manner in which the Amine "O" and Ethoduomeen T/25 additives affected the permeability of the Viking and Muddy sandstone cores as compared to the KCl brine standard is provided by FIGURES 1 and 2 of the drawings. In the tests yielding the data plotted in FIGURE 1, three 3 pore volume slugs of water treated respectively with 1,000 p.p.m. and 500,000 p.p.m. of Ethoduomeen T/25 and with 15 p.p.m. of Amine "O" were, on three separate runs, injected into a 1 cc. Viking plug and the treated slug was then followed by artificial injection water. It will be noted that both compounds, when used individually, had the effect of decreasing the permeability of the core from the permeability which was retained when the KCl brine (100,000 p.p.m.) was used.

In the tests yielding the data plotted in FIGURE 2, a 3 pore volume slug of water containing 1,000 p.p.m. of Ethoduomeen T/25, and a 3 pore volume slug of water containing 1,000 p.p.m. of the Amine "O" were initially each injected into two different 1 cc. Muddy sandstone plugs at residual hydrocarbon saturation, followed by formation brine in two different tests. In the case of this relatively less clayey sandstone, a considerable increase in permeability as compared to the KCl brine standard was realized through the addition of each of the amine compounds to the injected water.

EXAMPLE 3

A composition comprising a water solution containing 1,000 p.p.m. of potassium chloride, 1,000 p.p.m. Ethoduomeen T/25 and 25 p.p.m. Amine "O" was prepared in order to compare its effect upon formation permeability with that of other three component aqueous systems, and with that of the KCl brine standard. A test was also made of the plugs using untreated injection water. The plugs used were cut from the Viking sandstone, and had the properties hereinbefore described. In the tests of the aqueous three component systems, and of the untreated injection water, the treated water was injected as a continuous flood rather than as a 3 pore volume initial slug, as in the examples hereinbefore described.

The results of the three component systems and the untreated injection water as compared to the KCl brine standard are portrayed graphically in FIGURE 3 of the drawings. In referring to this graph, it will be perceived that the use of the composition of the present invention containing the KCl, the Ethoduomeen T/25 and the Amine "O" yielded results far superior to the results obtained with the other three component systems, and considerably improved the permeability of the core over that maintained when utilizing the potassium chloride brine solution alone.

EXAMPLE 4

In order to evaluate the synergism characteristic of the three components of the additive used in the present invention when these components are used in combination with each other in a waterflood, a number of laboratory core tests were run. In these tests, Viking sandstone plugs having a pore volume of approximately 1 cc., and having the permeability and porosity properties hereinbefore described, were flooded with water treated with various proportions of each of the individual components of the additive and various combinations of two of the components. In each case, the core was flooded with treated water or fresh water continuously, rather than an initial injection of treated water followed by brine. At various times after flow through the plug was commenced, the permeability of the plug was measured. The data set forth in Table I hereinafter clearly demonstrate the synergistic effect which is obtained when the three component system of the invention is utilized, as compared to the use of any single or two components of the system.

TABLE I

| Additive to Injection Water | Effect Upon Permeability (as compared to KCl brine) |
|---|---|
| Only fresh water (no additive) | Dropped to 50% after 5 pore volumes throughput. |
| One Component Systems: | |
| 1,000 p.p.m. KCl | Dropped to 88% after 15 pore volumes throughput. |
| 5,000 p.p.m. KCl | No drop or increase after 20 pore volumes throughput. |
| 50,000 p.p.m. KCl | No drop or increase after 100 pore volumes throughput. |
| 1,000 p.p.m. Ethoduomeen T/25 | Core plugged in less than 10 pore volumes throughput. |
| 200 p.p.m. Ethoduomeen T/25 | Dropped to 13% in 15 pore volumes throughput. |
| 100 p.p.m. Ethoduomeen T/25 | Dropped to 19% in 15 pore volumes throughput. |
| 15 p.p.m. Amine "O" | Dropped to 45% in 35 pore volumes throughput. |
| Two Component Systems: | |
| 500 p.p.m. KCl and 100 p.p.m. EDT/25.* | Dropped to 40% in 100 pore volumes throughput. |
| 100 p.p.m. KCl and 2 p.p.m. EDT/25. | Dropped to 58% in 100 pore volumes throughput. |
| 5,000 p.p.m. KCl and 100 p.p.m. EDT/25. | Increased to 110% in 100 pore volumes throughput. |
| 1,000 p.p.m. KCl and 1,000 p.p.m. EDT/25. | Dropped to 71% in 100 pore volumes throughput. |
| 1,000 p.p.m. KCl and 16 p.p.m. EDT/25. | Dropped to 53% in 100 pore volumes throughput. |
| 500 p.p.m. KCl and 15 p.p.m. Amine "O". | Dropped to 26% in 85 pore volumes throughput. |
| 1,000 p.p.m. KCl and 16 p.p.m. Amine "O". | Dropped to 32% in 100 pore volumes throughput. |
| 5,000 p.p.m. KCl and 15 p.p.m. Amine "O". | Dropped to 63% in 180 pore volumes throughput. |
| 1,000 p.p.m. KCl and 25 p.p.m. Amine "O". | Dropped to 33% in 100 pore volume throughput. |
| 500 p.p.m. KCl and 5 p.p.m. Amine "O". | Dropped to 44% in 130 pore volumes throughput. |
| 100 p.p.m. KCl and 2 p.p.m. Amine "O". | Dropped to 43% in 100 pore volumes throughput. |
| 5,000 p.p.m. KCl and 5 p.p.m. Amine "O". | Dropped to 83% in 250 pore volumes throughput. |
| 5,200 p.p.m. EDT/25 and 15 Amine "O". | Dropped to 70% in 100 pore volumes throughput. |
| 1,000 p.p.m. EDT/25 and 15 p.p.m. Amine "O". | Dropped to 42% in 100 pore volumes throughput. |
| Three Component Systems: | |
| 5,000 p.p.m. KCl, 100 p.p.m. EDT/25 and 15 p.p.m. Amine "O". | Increased to 140% in 100 pore volumes throughput. |
| 1,000 p.p.m. KCl, 1,000 p.p.m. EDT/25 and 25 p.p.m. Amine "O". | Increased to 130% in 100 pore volumes throughput. |
| 1,000 p.p.m. KCl, 1 p.p.m. EDT/25 and 15 p.p.m. Amine "O". | Decreased to 80% in 100 pore volumes throughput. |
| 100 p.p.m. KCl, 1 p.p.m. EDT/25 and 1 p.p.m. Amine "O". | Dropped to 70% in 100 pore volumes throughput. |

*EDT/25 is abbreviation for Ethoduomeen T/25.

In referring to Table I, it will be perceived that the best run obtained of any of the two component aqueous systems tested was that involving the use of water treated with 5,000 p.p.m. of KCl and 100 p.p.m. of the Ethoduomeen T/25. In this run, the permeability was increased to 110 percent of the value of the potassium chloride standard permeability after 100 pore volumes of treated water had been passed through the plug. Substantially all of the rest of the one and two component compositions tested yielded, in varying degrees, a decrease in the permeability of the plug over that which was observed when the KCl brine alone was used. By comparison, an increase in permeability to 140 percent of the standard KCl brine permeability was obtained when a three component aqueous system containing 5,000 p.p.m. KCl, 100 p.p.m. EDT/25 and 15 p.p.m. Amine "O" was utilized. The synergistic characteristic of the composition is further clearly demonstrated by the data set forth in Table I, and the data plotted in FIGURE 3.

EXAMPLE 5

The most critical phase encountered in waterflooding is the initial contact of the injected water with the region immediately surrounding the bore of the injection well. Any treatment which can be performed to maintain or increase the permeability of the formation must be especially effective in this region or the overall result will be poor. This is because the formation immediately around the well bore, unless properly treated at the outset, will tend to rob the injection water of the additive chemicals before the water progresses into the outward reaches of the producing formation. Also, this is the region of the greatest fluid pressure drop and throughput, and any deleterious permeability effects taking place here leave many times more serious consequences than those that might occur farther out from the well bore in the formation. Treatment therefore becomes less critical as the distance from the well bore increases. For these reasons, it was decided that higher concentrations of the components of the additive of this invention should be injected into the formation in an initial spearhead preceding the continuous injection.

In the laboratory core tests using the 1 cc. Viking sandstone cores, an initial spearhead of 50 pore volumes was made up to contain 50,000 p.p.m. KCl, 1,000 p.p.m. Ethoduomeen T/25 and 10 p.p.m. Amine "O" in water. The spearhead as thus made up was passed through two of the Viking sandstone cores, and the two runs are shown in the graph illustrated in FIGURE 4. After injection of the spearhead solutions, flooding of the cores was continued using solutions containing various concentrations of KCl, 20 p.p.m. of the Ethoduomeen T/25 and 10 p.p.m. of the Amine "O." The variation in concentration of the KCl is indicated in FIGURE 4. It will be noted in referring to FIGURE 4, that the spearhead solution gave a large initial increase in permeability as was expected. However, the concentrations of the additive used in the spearhead would be uneconomical for a continuous treatment. Moreover, in accordance with the foregoing explanation, once the portion of the formation immediately surrounding the well bore has been treated by the spearhead, continuous injection of water containing a high concentration of the additive components is not required.

EXAMPLE 6

A field test of the waterflood composition of the invention was carried out in an injection well located in the Eureka Viking Sand pool of the Coleville-Smiley field in Saskatchewan, Canada. The producing formation of this pool is the Viking sandstone found at a depth of approximately 2,300 feet. It consists of medium-grained shaley sand having a porosity and permeability of from about 8 to about 19 percent and from about 1 to about 36 millidarcies (to air), respectively. The interstitial water saturation of the formation is about 55 percent. The original bottom-hole pressure was about 900 p.s.i.g. The injection well used in the field test was initially completed with a 6,000 pound sand fracture treatment through a two-foot perforated interval.

In the field test, an initial spearhead treatment consisting of 50,000 p.p.m. KCl, 1,000 p.p.m. Ethoduomeen T/25 and 10 p.p.m. Amine "O" in 500 barrels of injection water was performed. Following the injection of the spearhead, the water used for continuous injection was initially treated with 1,000 p.p.m. potassium chloride, 10 p.p.m. Amine "O" and 10 p.p.m. of Ethoduomeen T/25.

FIGURE 5 is a graph in which the water injection rate (in barrels per day) and injection pressure (in pounds per square inch) is plotted against time in months. The insert on the graph is an electrical log of the formation.

After a two-month stabilization period, the concentrations of the KCl and Ethoduomeen T/25 were reduced by 50 percent. The maximum injection pressure prior to altering the chemical concentration was 1,535 p.s.i.g. After five days injection at the reduced concentrations, the maximum injection pressure had gradually risen to 1,610 p.s.i.g. The previous concentrations were restored at this point and approximately one month later the injection rate and pressure stabilized at 450 to 475 barrels per day and 1,750 p.s.i.g. Table II is a tabulation of the average chemical concentrations and injection values for the period during which the concentrations of the several components of the additives were reduced. Figures for one day prior to and following the alteration are also included.

TABLE II

| Date | Water Injected, bbl. | Rate, bbl./hr. | Maximum Pressure, p.s.i. | KCl, p.p.m. | Amine "O", p.p.m. | Ethoduomeen T/25, p.p.m. |
| --- | --- | --- | --- | --- | --- | --- |
| June 12 | 472 | 19.6 | 1,535 | 1,060 | 9.1 | 9.5 |
| June 13 | 481 | 20.0 | 1,545 | 595 | 8.9 | 4.7 |
| June 14 | 491 | 20.4 | 1,545 | 583 | 8.8 | 4.6 |
| June 15 | 471 | 19.6 | 1,590 | 605 | 9.1 | 4.8 |
| June 16 | 311 | 19.4 | 1,600 | 612 | 9.2 | 4.9 |
| June 17 | 488 | 20.3 | 1,610 | 585 | 8.8 | 4.6 |
| June 18 | 431 | 20.5 | 1,580 | 1,030 | 8.7 | 9.0 |

In FIGURE 6, a graph is presented in which are plotted the injection rates and injection pressures observed in a second well used for waterflooding in the Viking sandstone in the Saskatchewan field, and having an electrical log quite similar to that of the test well producing the data plotted in FIGURE 5. Moreover, the extent of shale and clay content in cores from the second well were comparable to the well into which the treated injection water was injected. It will be noted in referring to FIGURE 6 that the well used for comparison, and into which untreated water was injected, required higher injection pressures to achieve a much lower injection rate than was achieved when the treated water was injected into the test well. Thus, the increase of approximately 350 barrels of water per day which can be noted in the case of the test well relative to the comparison well is attributable to the chemicals used in the injection water.

From the foregoing description of the invention, it will have become apparent that the invention provides an improved procedure for retaining a high level of permeability in clayey formations during the recovery of hydrocarbons therefrom by waterflooding. The additive used to treat the injection water as proposed by the present invention is believed to be novel, is relatively economical to prepare, and is highly effective in the three functions which it performs. These functions of the additive are to prevent, or greatly reduce, swelling of the water sensitive clay minerals in the formation, to reduce the tenacity with which the oil clings to the formation particles or, stated differently, to exhibit a strong detergent effect, and to prevent the growth of bacteria in the floodwater to the extent that the bacteria produce serious plugging or obstruction of the pores of the formation. As a practical matter, in the practice of the invention it will generally be preferable to cut back on the concentration of the additive components in the injection water as the life of the flood is extended so that satisfactory injection rates may be maintained without excessive and uneconomical use of the additive. Empirical observations may be used to determine when the cutback in additive concentration has reduced the injection rate to an undesirably low level.

Although a specific embodiment of the invention has been hereinbefore described, and relatively few materials which may be used in practicing the invention have been specifically identified in the working examples, it will be apparent that other equivalents of these materials, and various modifications in the steps of the process may be undertaken without a meaningful or substantial departure from the basic principles of the invention. Insofar, therefore, as any practice of waterflooding entails a reliance upon the basic principles which have been hereinbefore identified, all such practices are deemed to be circumscribed by the spirit and scope of this invention except as the same may be necessarily limited by the appended claims or reasonable equivalents thereof.

What is claimed is:

1. A process for maintaining permeability while waterflooding a petroliferous subterranean formation which comprises injecting into the formation an effective amount of an aqueous solution comprising:
   from about 100 p.p.m. to about 500,000 p.p.m. of a water-soluble potassium salt;
   from about 1 p.p.m. to about 5,000 p.p.m. of a relatively high molecular weight, cationic, trimethylene diamine having the general structural formula

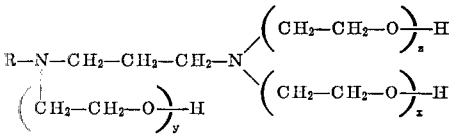

where R is an alkyl group derived from a fatty acid and contains from about 12 to about 20 carbons atoms, and $x+y+z$ equals from about 5 to about 25; and
   from about 1 p.p.m. to about 25 p.p.m. of a relatively high molecular weight imidazoline selected from the group consisting of imidazoline compounds having the general structural formulae

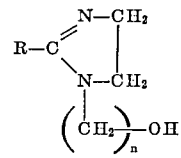

and

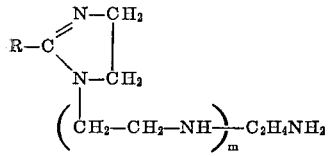

where R is an alkyl group derived from a straight chain fatty acid and containing from about 14 to about 22 carbon atoms, $n$ is an integer of from 1 to 3 and $m$ is an integer of from 0 to 2.

2. The process for waterflooding a petroliferous subterranean formation as defined in claim 1 wherein said relatively high molecular weight, cationic, trimethylene diamine has the structural formula

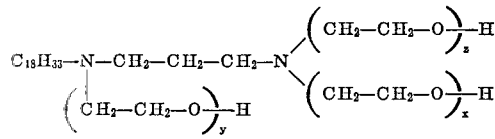

where the sum of $x+y+z$ is about 15.

3. The process as defined in claim 1 wherein said imidazoline is 1-hydroxyethyl-2-heptadeceyl imidazoline.

4. A process for waterflooding a petroliferous formation which comprises:
   (a) injecting into the formation, a concentrated spearhead of aqueous solution comprising:
      water;
      from about 5,000 p.p.m. to about 500,000 p.p.m. of a water-soluble potassium salt;
      from about 5 p.p.m. to about 5,000 p.p.m. of a high molecular weight, cationic, trimethylene diamine having the structural formula

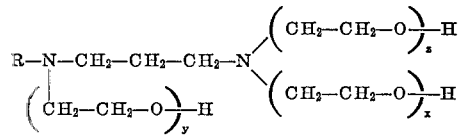

where R is an alkyl group derived from a fatty acid and contains from about 12 to about 25 carbon atoms and where $x+y+z$ equals from about 5 to about 25; and
   from about 5 to about 25 p.p.m. of an imidazoline compound selected from the group consisting of the structural formulae

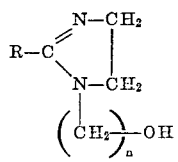

and

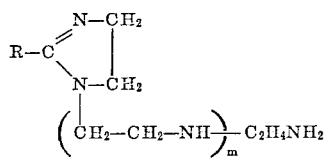

wherein R is a hydrocarbon group derived from a straight chain fatty acid and containing from about 14 to about 22 carbon atoms, n is an integer of from 1 to 3 and m is an integer of from 0 to 2;

(b) injecting into said formation after said aqueous spearhead solution, an aqueous solution comprising:
water;
from about 500 p.p.m. to about 5,000 p.p.m. of said water-soluble potassium salt;
from about 5 p.p.m. to about 200 p.p.m. of said trimethylene diamine compound; and
from about 5 p.p.m. to about 15 p.p.m. of said imidazoline compound.

5. The process defined in claim 4 wherein from about 2 pore volumes to about 10 pore volumes of said spearhead solution are injected into said formation before the second described aqueous solution is injected following said spearhead.

6. The process defined in claim 5 wherein said water-soluble potassium salt is potassium chloride and said imidazoline compound is 1-hydroxyethyl-2-heptadeceyl imidazoline.

7. An aqueous composition for flooding a petroliferous subterranean formation to recover hydrocarbons therefrom comprising:
(a) water;
(b) from about 100 p.p.m. to about 500,000 p.p.m. of a water-soluble potassium salt;
(c) from about 1 to about 5,000, p.p.m. of a high molecular weight, cationic, trimethylene diamine having the structural formula

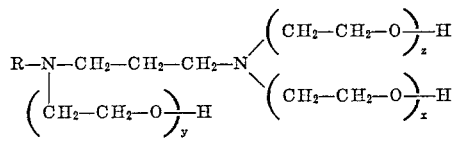

where R is an alkyl group derived from a fatty acid and containing from about 12 to about 20 carbon atoms, and where x+y+z equals from about 5 to about 25; and
(d) from about 1 p.p.m. to about 25 p.p.m. of an imidazoline compound selected from the group consisting of the structural formulae

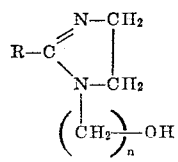

and

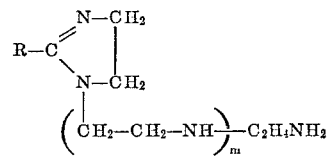

wherein R is an alkyl group derived from a straight chain fatty acid and containing from about 14 to about 22 carbon atoms, n is an integer of from 1 to 3 and m is an integer of from 0 to 2.

8. A composition as defined in claim 7 wherein said imidazoline compound is 1-hydroxyethyl-2-heptadecenyl imidazoline.

9. An additive for treating water injected into petroliferous formation to recover petroleum therefrom consisting essentially of:
from about 100 to about 500,000 parts by weight of a water-soluble potassium salt;
from about 1 to about 5,000 parts by weight of a high molecular weight, trimethylene diamine having the structural formula

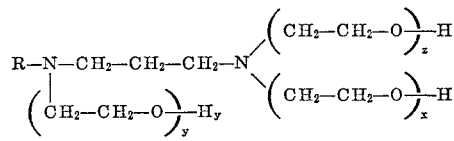

where R is an alkyl group derived from a fatty acid and containing from about 12 to about 20 carbon atoms, and where x+y+z equals from about 5 to about 25; and
from about 1 to about 25 p.p.m. of an imidazoline compound selected from the group consisting of the structural formulae

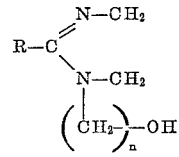

and

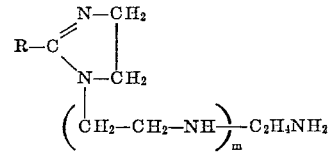

wherein R is an alkyl group derived from a straight chain fatty acid and containing from about 14 to about 22 carbon atoms, n is an integer of from 1 to 3 and m is an integer of from 0 to 2.

10. An additive as defined in claim 9 wherein said imidazoline compound is 1-hydroxyethyl-2-heptadecenyl imidazoline.

References Cited

UNITED STATES PATENTS

| | | | |
|---|---|---|---|
| 2,226,119 | 12/1940 | DeGroote et al. | 252—8.55 |
| 2,782,859 | 2/1957 | Garst | 252—8.55 |
| 2,867,279 | 1/1959 | Cocks | 252—8.55 |
| 2,950,246 | 8/1960 | Hughes et al. | 252—8.55 |
| 3,017,351 | 1/1962 | Scott et al. | 252—8.5 |
| 3,020,953 | 2/1962 | Zerweck et al. | 252—8.55 |

OTHER REFERENCES

Armour, Ethoxylated Chemicals, publication by Armour Industrial Chemical Company, May 1964, pp. 2, 3, 4, and 5.

LEON D. ROSDOL, *Primary Examiner.*

H. B. GUYNN, *Assistant Examiner.*